Patented May 29, 1945

2,377,038

UNITED STATES PATENT OFFICE

2,377,038

MANUFACTURE OF PERACIDS

Joseph S. Reichert, Samuel A. McNeight, and Arthur A. Elston, Niagara Falls, N. Y., assignors to E. I. du Pont de Nemours & Company, Wilmington, Del., a corporation of Delaware No Drawing. Application September 15, 1941, Serial No. 410,878

6 Claims. (Cl. 260—502)

This invention relates to a new and improved process for the preparation of peracids and their salts, and to the novel peracids and persalts resulting therefrom. More particularly, it relates to a new and improved method for the preparation of the organic peracids, particularly the monoperacids, and the salts of these acids in aqueous solutions of relatively dilute concentration. This application is, in part, a continuation of our copending application Serial No. 317,318, filed February 5, 1940.

The organic peracids constitute a class of acids which are chemically characterized by the presence of the perhydroxyl grouping OOH as part of the molecule. They may be regarded as derived from other acids by replacing the hydroxyl group containing the ionizable hydrogen atom of said acids by the perhydroxyl group OOH. Thus, monopersuccinic acid has the chemical constitution

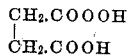

and may be regarded as derived from succinic acid,

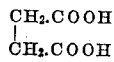

by replacing a hydroxyl group containing an ionizable hydrogen atom with the perhydroxyl group.

The invention with which this application is especially concerned involves a process for preparing solutions of organic peracids or their salts, more particularly aqueous solutions of monoperacids and the alkali-forming salts of the monoperacids, by reacting an acid anhydride with an inorganic peroxide or peroxygen compound under conditions wherein the pH of the resulting peracid or persalt solution is carefully controlled so as to fall within certain limits. As the inorganic peroxide or percompound, ordinarily we prefer to utilize hydrogen peroxide or sodium peroxide, and we have found that the peracids and their salts are produced in very satisfactory yields in the dilute solutions that we are especially interested in preparing when the reaction is carried out under controlled conditions.

Methods previously employed for preparing peracids have involved either reacting acid anhydrides with solutions of hydrogen peroxide which were acidic in reaction at ordinary room temperatures or temperatures below room temperatures, or reacting them with strongly alkaline peroxide solutions at temperatures below 10° C. and preferably below 0° C. These known methods require the use of peroxide solutions having active oxygen concentrations equivalent to at least 7 volumes if satisfactory yields of peracids are to be obtained. The temperature under which the reaction proceeds is also of considerable importance in these methods, and it has generally been necessary to maintain an unusually low temperature. These disadvantages have restricted the use of such methods, both because the handling of peroxide solutions of high concentration may be inconvenient, as well as because of the necessity for cooling or otherwise controlling the temperature of the reaction mixture. Our improved procedure makes it possible to prepare peracid solutions from peroxide solutions of relatively low active oxygen concentrations, concentrations of from 0.006 to 7.0 volumes, although it may also be employed effectively for manufacturing organic peracid and persalt solutions of as high as 12.5 volumes. Rigorous control of the temperature under which the reaction proceeds is avoided, and by suitable control of the pH we have found it possible to prepare peracids and persalts in high yields at temperatures ranging anywhere from 15° C. to 90° C.

In referring to the concentration of a solution of a peroxygen compound, such as alkali metal peroxide, hydrogen peroxide, sodium perborate, etc., or in referring to the concentration of an aqueous solution of a peracid or persalt, it is usual in the art to refer to "volume concentration." The volume concentration of such an aqueous solution is the number of volumes of oxygen gas, measured at 0° C. and 760 mm. of mercury pressure, that would be released upon complete decomposition from one volume of the solution measured at 20° C. There is, of course, a definite correlation between the actual concentration of the solution and the volume concentration, depending on the particular oxidizing agent involved. Thus a solution of hydrogen peroxide of 100 volumes concentration, a solution sold generally for commercial use under the trade-mark name "Albone," for example, contains at least 27.6% $H_2O_2$ by weight.

In aqueous solution the organic peracids and the salts of these peracids, particularly their alkali-forming salts, are full equivalents of each other. As far as the utility of the solution of the oxidizing agent is concerned, it makes little difference whether the peracid radical is part of the acid or of the salt of the acid. In any given solution the relative amounts of organic peracid and salt of this peracid depend generally upon the pH of the solution. In view of the full equivalency between the organic peracids and persalts, it is usual to use the term "peracid" generically to include not only the acids themselves, but their salts, particularly the alkali-forming salts. Elsewhere throughout this specification and the appended claims this procedure will be adopted, the term "peracid" or "peracids" including the salts of these acids.

As previously stated, the peracids may be generally regarded as derived from acids by replacement of one or more of the hydroxyl groups containing an ionizable hydrogen atom by the perhydroxyl group OOH. A typical example is monopersuccinic acid, which may be generally regarded as derived from succinic acid. Other examples of organic monoperacids which can be manufactured in high yields in relatively dilute solution without the necessity for controlling the temperature, in accordance with our improved process, include peracetic acid, monoperphthalic acid, monopermaleic acid, monoperglutaric acid, and monoperterephthalic acid. In addition to such monoperacids derived from organic acids containing one or more carboxyl groups, there are of course monoperacids derived by the introduction of a perhydroxyl group into other classes of organic acids. Thus, monoperacids which may be prepared in accordance with our process include those derived by introducing a perhydroxyl group in place of the hydroxyl group containing the ionizable hydrogen atom of a hydroxy organic acid. Peracids may in this way be derived from all classes of saturated and unsaturated acids, whether the acids be aliphatic or aromatic. Other organic acids not characterized by the presence of a carboxyl group, such as the sulfonic acids, either aliphatic or aromatic, may be regarded as base acids from which peracids capable of manufacture by means of our improved method may be derived by the substitution previously noted.

Peracids may also be derived from heterocyclic compounds such as furoic acid. While our invention is directed to the manufacture primarily of the organic monoperacids, under certain circumstances our process may be used to form diperacids and, even under certain circumstances, triperacids.

Among aliphatic organic acids from which monoperacids may be regarded as derived, which monoperacids may be prepared in accordance with our improved process, we may mention both monobasic acids, of which acetic acid is an example, as well as dibasic acids, of which succinic acid is an example. Among hydroxy acids yielding peracids are acids such as lactic acid, glycolic acid, tartaric acid, and malic acid. Unsaturated aliphatic dibasic acids such as maleic acid, and monobasic acids such as crotonic acid, also yield corresponding organic peracids which may be manufactured by our improved method.

The aromatic acids also yield peracids, a typical example of which is monoperbenzoic acid, prepared by replacing the hydroxyl group containing the ionizable hydrogen atom of benzoic acid by a perhydroxyl group. Other aromatic acids yielding peracids include the previously mentioned phthalic acid, yielding monoperphthalic acid, as well as various alicyclic organic acids such as cyclohexane carboxylic acid and cyclohexane dicarboxylic acid. Among specific sulfonic acids from which both monoperacids and, where two ionizable hydrogen atoms are present, diperacids may be derived, which acids are capable of being manufactured by our improved method, are acids such as benzene sulfonic acid and naphthalene sulfonic acid. Among heterocyclic acids, nicotinic acid, quinolinic acid, and furoic acid are also compounds from which peracids may be derived.

In fact, any organic peracid such as, for example, in addition to the acids previously mentioned, perpropionic acid, monopercrotonic acid, monoperadipic acid, persulfobenzoic acid, monopernaphthalic acid, and the peracids derived from acid anhydrides by the Diels-Alder diene synthesis such as those prepared from maleic anhydride with cyclopentadiene, butadiene, benzene, terpenes and rosin hydrocarbons, and derivatives of naphthoquinoline, pyridine and heterocyclic hydrocarbons may be prepared by our improved method. Among organic acids containing no carboxyl groups which may be regarded as base acids from which peracids are derivable by the previously noted substitution, we may include phosphonic acids, the corresponding peracids being capable of manufacture by our improved method.

In accordance with our improved process, solutions of peracids or their salts are prepared by reacting an organic acid anhydride and a solution of a peroxygen compound of the desired concentration, the alkali content of the solution being so adjusted that the peracids formed during the reaction are partly or completely neutralized. When a peroxide solution, such as a solution of sodium peroxide or hydrogen peroxide, is utilized as the peroxygen compound, the reaction is carried out by preparing a peroxide solution of the desired concentration. The alkali content of this solution is then so adjusted that the peracids and acids subsequently formed, upon the addition of the organic acid anhydride, are partly or completely neutralized. Generally an equimolar amount of the selected organic acid anhydride is dissolved in the alkaline peroxide solution, whereupon the reaction proceeds to form the desired peracid or persalt.

We have found that by suitable adjustment of the alkali content of the solution of the peroxygen compound reacted with the anhydride, solutions of peracids may be formed at temperatures ranging from 15° C. to 90° C. and with active oxygen concentrations ranging from 0.006 volume to 12.5 volumes. In all cases satisfactory yields of peracid or persalt are secured. This process constitutes a distinct improvement as far as preparing peracid solutions of these low concentrations is concerned, since previous methods for preparing such solutions, particularly solutions of concentration ranging from 0.006 volume to 7.0 volumes, have necessitated the maintenance of unusually low temperature conditions during the reaction.

The adjustment of the alkali content of the solution of peroxygen compound reacted is simple and convenient. Within certain limits exact adjustment is not essential. The amount of alkali required to insure satisfactory conversion of the peroxygen compound such as hydrogen peroxide or sodium peroxide to the peracid when preparing the aqueous solution of peracid or persalt may be stated either in terms of chemical equivalence of a particular alkalizing agent, or in terms of hydrogen ion concentration of the peracid solution after the anhydride has more or less completely reacted with the peroxide.

The various alkalies or alkalizing agents which may be employed in preparing peracids and persalts in solution vary individually from one another in amount required to neutralize the acids and peracids formed. For this reason we prefer to express the amount of alkali or alkalizing agent necessary in terms of the hydrogen ion concentration (pH) of the solution after substantially all of the anhydride has reacted with the peroxygen compound. Throughout this specification and claims we designate this pH for convenience as the "final pH" of the solution. In expressing the amount of alkali or alkalizing agents required in terms of final pH, we found that while the amounts will vary with the different alkalizing agents which may be employed, the preparation of the solutions of peracids and persalts will proceed essentially in the same manner and with substantially the same conversion of peroxygen compound to peracid, regardless of the alkalizing agent utilized, when a sufficient quantity of the agent is present to give in each case the same final pH. It may be remarked that one experienced in acidimetry and alkalimetry can readily establish and calculate the relationship between the amount of alkalizing agent and the final pH which that amount will give to the solution, but the determination of such relationship is not necessary for the practice of our invention, as the amounts of alkalizing agents added may be varied within wide limits without appreciable effect on the preparation of the peracid.

Among peroxygen compounds capable of utilization in our process, by reaction with the organic acid anhydride to form peracids and persalts in solution without the necessity for careful regulation of the temperature conditions under which the reaction is carried out, we may specifically mention hydrogen peroxide, the alkali metal peroxides such as sodium peroxide, and persalts such as sodium perborate. For adjusting the alkaline condition of the solution and for securing the final pH, we prefer to use alkalizing agents such as caustic soda, sodium carbonate, sodium bicarbonate, tetrasodium pyrophosphate, trisodium phosphate, and ammonium hydroxide. When it is necessary to reduce the alkalinity of the solution in order to secure the final pH, we prefer to utilize acids such as sulfuric and boric, although almost any mineral acid, and organic acids such as acetic, citric, and tartaric may be utilized with equal success.

In carrying out our process the acid anhydride and the peroxygen compound are reacted under such conditions, the alkali content of the reaction mixture being so adjusted, that the final pH, i. e., the pH when the reaction is complete, will fall within the range 5.0 to 11.0. In carrying out the process so that a final pH within this range is obtained we have secured maximum conversion of the peroxygen compound to peracid. This maximum conversion will vary to a slight extent with the active oxygen concentration of the peracid solution, and to some extent upon the particular peracid being formed, but in most cases we secure a yield in excess of 70%. Yields in excess of 90% are not uncommon, and when preparing peracids such as peracetic acid, monopersuccinic acid, or monoperphthalic acid, high yields are ordinarily obtained.

While the reaction should be carried out under such conditions that the final pH of the solution at the conclusion of the reaction will fall within the range 5.0 to 11.0, ordinarily for most purposes we prefer to operate so that this final pH falls within the range 8.0 to 11.0. The preferred embodiment of our process may therefore be regarded as involving carrying out the reaction between the organic acid anhydride and the peroxygen compound in a reaction mixture containing such quantity of alkali that the final pH, at the conclusion of the reaction, falls within the range 8.0 to 11.0. When the amount of alkali present is reduced so that the final pH drops below 8.0 in the preparation of the peracid, the conversion of peroxygen compound to peracid decreases, but not seriously, until a pH of below 5.0 is reached. With volume concentrations of 1 volume or less, however, satisfactory yields of peracid are obtained even with final pH values which fall within the range 3.0 to 5.0. At higher concentrations, those ranging from 1 volume to 12.5 volumes, satisfactory yields are not in general obtained when the final pH is below 5.0, and for most purposes we prefer to operate so that the final pH is 8.0 to 11.0. When the peracid or persalt is produced under conditions such that the final pH is substantially higher than 11.0, the peroxide or other peroxygen compound appears to be unstable in the reaction mixture and cooling is generally necessary in order to secure satisfactory yields.

Since our process is one capable of being carried out at ordinary room temperature, for yields high enough to satisfy commercial requirements we prefer that the final pH fall within the range 8.0 to 11.0. Under such conditions the preparation of the peracids may be carried out at higher temperatures, for example temperatures up to 180° F., without too seriously reducing the yields. The ability to carry out the reaction at temperatures up to 180° F. is particularly advantageous when it is desired that the resulting peracid or persalt solution be utilized for treating materials at those temperature conditions. While the reaction between the organic acid anhydride and the peroxide or other peroxygen compound is more rapid at high temperatures, the tendency of the peracid or persalt to decompose is also greater under such conditions. When the solution of the peracid is therefore prepared at high temperatures, such for example as temperatures in excess of 120° F., it is essential that it be employed for its intended use without substantial delay. This is practical where the peracid solution which is to be utilized at high temperature is prepared in the presence of the material which is to be treated with the peracid or persalt.

As a generalized preferred procedure for carrying out our invention, the following may be taken as illustrative.

A peroxygen compound, such for example as hydrogen peroxide, sodium peroxide, or sodium perborate, is dissolved in water in amount sufficient to yield a solution of the desired active oxygen concentration. This concentration will fall within the range 0.006 volume to 12.5 volumes. The alkali content of this solution is adjusted so that the final pH secured at the end of the reaction will fall within the range 5.6 to 11.0 and preferably, especially when commercially important yields are to be secured, within the range 8.0 to 11.0.

Since sodium peroxide or sodium perborate in solution contribute considerable alkali thereto, it is obvious that these compounds are particularly useful in our process. We have observed that in general the final pH within the desired range will be secured when the solution contains from ¾ to 2 equivalents of an alkali or alkaline salt such as caustic soda, ammonium hydroxide, borax, or the alkali metal salts of carbonic acid, pyrophosphoric acid, or phosphoric acid, for each mole of active oxygen present in the solution. To this solution at the desired temperature, preferably within the range 15° C. to 90° C., there is added an equimolar amount of the desired organic acid anhydride. If the anhydride is a salt it is preferable that it be ground to a fine powder, although of course this is not absolutely essential. The reaction mixture is now agitated until the anhydride is dissolved, whereupon the solution is ready for use.

While the reaction between the organic acid anhydride and the peroxygen compound is not instantaneous, in many cases it is nearly so. The time required for the preparation may range from 1 to 30 minutes, depending upon the temperature, alkalinity, active oxygen concentration, solubility of the organic acid anhydride, and the degree of agitation practiced. In general we prefer to carry out the reaction in the presence of an alkali metal oxide or hydroxide such as sodium or ammonium hydroxides, or the alkaline salt of an alkali metal and a relatively weak acid such as borax, sodium carbonate, sodium phosphate, or sodium pyrophosphate. When alkaline salts are employed it is necessary to take into consideration that in some cases only part of the total alkali metal present in the salt is available for the neutralization of acids. Sodium pyrophosphate, $Na_4P_2O_7$, for example, contains four atoms of sodium per molecule, of which only two are available for neutralizing acids. Borax, $Na_2B_4O_7$, on the other hand, contains two atoms of sodium, both of which are available for neutralization. Although we prefer to carry out the preparation of peracids in the presence of sodium hydroxide, either added as such or introduced by utilization of sodium peroxide as the peroxygen compound, because of its high neutralizing effect and relative cheapness, these alkalies or other alkalies may be employed for the purpose with equally good results. In order to secure satisfactory yields of the peracids and persalts at ordinary temperatures in accordance with our preferred process, it is only necessary that the final pH at the conclusion of the reaction fall within the range noted.

Hydrogen peroxide, sodium peroxide, and sodium perborate are of course our preferred peroxygen compounds in view of their low cost and commercial availability. However, other peroxides such as urea peroxide, as well as perphosphates and salts containing hydrogen peroxide of crystallization, may be utilized. These include the peroxides and hydroperoxides of alkali and alkaline earth metals.

Because of the inexpensiveness and general availability of the organic acid anhydrides, we prefer to react the anhydrides of acetic, succinic, or phthalic acids in order to secure the corresponding peracids and persalts. However, other aliphatic anhydrides such as propionic, butyric, and valeric anhydrides, including the unsaturated acid anhydrides such as crotonic and maleic anhydrides, are generally available and will give good results when reacted in accordance with our process. Among aromatic anhydrides generally available, benzoic and naphthalic anhydrides will form the corresponding peracids or persalts in good yields when reacted in accordance with our process. Mixtures of anhydrides, and mixed anhydrides, may also be employed.

In addition to the alkali metal and ammonium salts, oxides or hydroxides suitable for use in adjusting the alkalinity of the reaction mixture, alkaline earth metal hydroxides, oxides or salts such as those of calcium or magnesium may also be utilized with equal success.

Similarly, modifications of the illustrative preferred procedure may be adopted which will give very satisfactory results. While it is preferable in most cases to have all of the alkali required present in the solution before adding the organic acid anhydride, it may be more convenient in some cases to add the alkalizing agent simultaneously with the anhydride, or to add part of the alkalizing agent to the solution of the peroxygen compound, adding the rest with or immediately after addition of the anhydride.

Solutions of organic peracids and their salts thus prepared possess excellent oxidizing and bleaching properties. They operate to bleach rapidly at relatively low temperatures both in neutral and acid media. As contrasted with peroxygen compounds such as hydrogen peroxide, they generally operate to bleach more rapidly and are distinguished, for example, from hydrogen peroxide where longer times, higher temperatures, and the maintenance of an alkaline medium are generally, although not always, requisite.

The procedure described makes possible the preparation of peracid and persalt solutions of low active oxygen concentration under a relatively wide range of temperatures extending generally from 15° C. to 90° C. It permits the preparation of peracid solutions of the desired temperatures, pH, and volume concentration, suitable for special applications of these solutions, by a process which requires no cooling or other control of temperature in order to obtain high yields. The solutions may be prepared quickly and in large quantities with equipment readily available in most commercial establishments. The presence of a large excess of either the peroxygen compound, the anhydride, or the alkalizing agent, is not necessary in order to secure the desired yields. These combined advantages render the process extremely valuable for many industrial processes where, to date, the peracids and persalts have not been readily available because not readily prepared on the job, and when prepared elsewhere not generally stable enough to permit their storage or transportation.

As examples of our new and improved process the following may be given.

*Example 1*

Solutions of hydrogen peroxide of 0.025 volume concentration were prepared by diluting commercial 100 volume hydrogen peroxide solution. To one of these solutions there was added sodium hydroxide in the amount of 1.25 moles per mole of hydrogen peroxide present. To the other solution 2.0 moles of sodium hydroxide per mole of hydrogen peroxide were added.

Each of these solutions was then reacted with the stoichiometric amount of acetic anhydride necessary to produce peracetic acid. The pH of the reaction mixture at the completion of the reaction in the first case was 7.8; and in the second case it was 9.4. The peracid yield at the lower pH was 80.5%, whereas at the higher pH the yield of peracetic acid or its salts amounted to 96.4% of the theoretical.

*Example 2*

Five 1 volume solutions of hydrogen peroxide were prepared by dilution of commercial 100 volume hydrogen peroxide solution. Different amounts of sodium hydroxide were added to each of these solutions, the amounts being so selected as to give final pH values, at the conclusion of the reaction to form the peracid, within the pH range 5.0 to 11.0. The number of moles of sodium hydroxide per mole of peroxide present added to each of the five solutions are given in the following tabular summary.

While the temperature was maintained at approximately 90° F., the stoichiometric quantity of acetic anhydride necessary to form peracetic acid was added to each of the solutions. Reaction in each case was complete within a very few minutes, the yields of peracetic acid in each solution being as follows:

| Solution | Number of moles of NaOH per mole of peroxide present | Per cent yield |
|---|---|---|
| A | 1.00 | 92.5 |
| B | 1.12 | 86.3 |
| C | 1.25 | 88.5 |
| D | 1.50 | 94.2 |
| E | 2.00 | 92.4 |

Example 3

Four solutions of hydrogen peroxide of 3 volume concentration were prepared, and to each of these solutions was added sufficient alkali to bring the final pH, at the conclusion of the subsequent reaction with acetic anhydride, to one falling within the range 5.0 to 11.0. The amounts of sodium hydroxide added per mole of hydrogen peroxide are given in the following table.

To each of these solutions the stoichiometric quantity of acetic anhydride necessary was added, and the reaction permitted to proceed at room temperature until complete. The table gives the percentage yields of peracetic acid in each case, together with the final pH of the solution.

| Solution | Number of moles of NaOH per mole of peroxide present | Final pH | Percentage yield of peracetic acid |
|---|---|---|---|
| 1 | 0.75 | 5.1 | 73.9 |
| 2 | 1.00 | 5.7 | 81.6 |
| 3 | 1.25 | 7.5 | 87.2 |
| 4 | 2.0 | 10.0 | 91.3 |

Example 4

Four solutions of hydrogen peroxide of 7 volume concentration were prepared by dilution of commercial 100 volume solution. To each solution sodium hydroxide was added in the following amounts:

Solution A—0.5 mole per mole of hydrogen peroxide
Solution B—1.0 mole per mole of hydrogen peroxide
Solution C—1.25 moles per mole of hydrogen peroxide
Solution D—2.0 moles per mole of hydrogen peroxide The temperature of the solutions was maintained at 90° F. and the stoichiometric amount of acetic anhydride added. No attempt was made to control the temperature in any way during the reaction. At the end of a few minutes reaction was complete, the final pH values and the yields of peracetic acid being as follows:

| Solution | Final pH | Yield |
|---|---|---|
|  |  | Per cent |
| A | 5.0 | 84.9 |
| B | 5.0 | 80.0 |
| C | 5.9 | 78.2 |
| D | 9.4 | 80.0 |

Example 5

Six solutions of hydrogen peroxide, each of 1 volume concentration, were prepared. The temperature of the solutions in each case was approximately 90° F. Various amounts of the alkalizing agents noted in the following table were added, and the stoichiometric amount of acetic anhydride necessary to produce peracetic acid then added to the alkaline solution. After sufficient time had been allowed for reaction to be complete, the final pH values were determined and the percentage yields of peracetic acid secured. The yields were in all cases very satisfactory.

| Alkalizing agent used | Solution #1, sodium bicarbonate $NaHCO_3$ | Solution #2, borax $Na_2B_4O_7$ | Solution #3, sodium carbonate $Na_2CO_3$ | Solution #4, sodium pyrophosphate $Na_4P_2O_7$ | Solution #5, sodium phosphate $Na_3PO_4$ | Solution #6, ammonium hydroxide $NH_4OH$ |
|---|---|---|---|---|---|---|
| Moles alkalizing agent per mole $H_2O_2$ | 5.0 | 1.00 | 1.00 | 1.50 | 1.00 | 1.25 |
| pH of peroxide solution before addition of anhydride | 7.6 | 7.8 | 10.5 | 9.7 | 10.7 | 10.2 |
| Time required for complete reaction, minutes | 15 | 15 | 15 | 15 | 1–2 | 15 |
| Final pH of solution after reaction | 7.0 | 7.0 | 7.2 | 7.4 | 7.4 | 5.7 |
| Percent conversion of peroxide to peracid | 89.0 | 93.5 | 90.2 | 90.8 | 88.5 | 80.5 |

Example 6

Various solutions of sodium perborate of volume concentration ranging from 0.025 volume to 12.5 volumes were prepared by dissolving the salt in water at a temperature of 80° F. An equimolar amount of succinic anhydride, the stoichiometric amount necessary to form persuccinic acid, was then added to each of the alkaline solutions, which were then subjected to agitation. At the end of ten minutes the final pH of each solution was determined, as well as the percentage conversion to persuccinic acid. The results are given below.

| Volume concentration of perborate solution | Final pH of solution at termination of reaction | Percentage of conversion to persuccinic acid |
|---|---|---|
| 0.025 | 5.6 | 71.7 |
| 1.0 | 5.4 | 71.6 |
| 3.0 | 5.2 | 77.4 |
| 7.0 | 5.2 | 88.7 |
| 12.5 | 5.0 | 71.3 |

Example 7

A solution of sodium perborate of 0.0125 volume concentration was prepared by dissolving the salt in water at 120° F. Phthalic anhydride in the stoichiometric amount necessary to form monoperphthalic acid was then added to the alkaline solution. At the end of five minutes analysis of the solution showed that the percentage yield was substantially 50.0%, the final pH being 5.1. It was not necessary to cool the reaction mixture, but the phthalic anhydride was thoroughly dispersed throughout the solution by vigorous stirring.

Wherever throughout this specification and the appended claims reference is made to a peracid or to peracids it is intended to include within the scope of that term the salt of the peracid or peracids. As previously explained, in aqueous solutions these constitute full equivalents of each other, the particular form in which the peracid radical appears being dependent essentially only on the pH of the aqueous solution.

As various changes might be made in our process without departing from the spirit of the invention, it is our intention that the invention be not restricted to precise details, conditions and amounts given as illustrative of the preferred embodiments thereof except as necessitated by the appended claims and prior art.

We claim:

1. The method of preparing a member of the group consisting of the organic peracids and their alkali-forming salts which comprises reacting, in an aqueous reaction medium, the anhydride of a carboxylic acid and an alkaline solution of an inorganic peroxygen compound having a volume concentration ranging from 0.006 volume to 12.5 volumes, there being present in said aqueous reaction medium sufficient alkali to insure a final pH, at the conclusion of the reaction, falling within the range 8.0 to 11.0.

2. The method of preparing a member of the group consisting of the organic peracids and their alkali-forming salts in aqueous solutions of volume concentration ranging from 0.006 volume to 12.5 volumes which comprises reacting, in an aqueous reaction medium, the anhydride of a carboxylic acid and a dilute solution of an inorganic peroxygen compound selected from the group which consists of hydrogen peroxide, sodium peroxide, and sodium perborate, said solution having a volume concentration ranging from 0.006 volume to 12.5 volumes, and there being present in said aqueous reaction medium sufficient alkali to insure a final pH, at the conclusion of the reaction, falling within the range 8.0 to 11.0.

3. The method of preparing a member of the group consisting of the organic peracids and their alkali-forming salts which comprises reacting, in an aqueous reaction medium, the anhydride of an organic acid selected from the group which consists of acetic acid, succinic acid, and phthalic acid, and a dilute solution of an inorganic peroxygen compound said solution having a volume concentration ranging from 0.006 volume to 12.5 volumes, there being present in said aqueous reaction medium sufficient alkali to insure a final pH, at the conclusion of the reaction, falling within the range 8.0 to 11.0.

4. The method of preparing a member of the group consisting of peracetic acid and its alkali-forming salts which comprises reacting, in an aqueous reaction medium, acetic anhydride and an inorganic peroxygen compound said solution having a volume concentration ranging from 0.006 volume to 12.5 volumes, there being present in said reaction medium sufficient alkali to insure a final pH, at the conclusion of the reaction, falling within the range 8.0 to 11.0.

5. The method of preparing a member of the group consisting of monopersuccinic acid and its alkali-forming salts which comprises reacting, in an aqueous reaction medium, succinic anhydride and an inorganic peroxygen compound said solution having a volume concentration ranging from 0.006 volume to 12.5 volumes, there being present in said reaction medium sufficient alkali to insure a final pH, at the conclusion of the reaction, falling within the range 8.0 to 11.0.

6. The method of preparing a member of the group consisting of monoperphthalic acid and its alkali-forming salts which comprises reacting, in an aqueous reaction medium, phthalic anhydride and an inorganic peroxygen compound said solution having a volume concentration ranging from 0.006 volume to 12.5 volumes, there being present in said reaction medium sufficient alkali to insure a final pH, at the conclusion of the reaction, falling within the range 8.0 to 11.0.

JOSEPH S. REICHERT.
SAMUEL A. McNEIGHT.
ARTHUR A. ELSTON.